June 15, 1965  P. CARPIGIANI  3,188,826
APPARATUS FOR AUTOMATICALLY CONTROLLING THE HARDNESS
OF ICE CREAM IN CONTINUOUS ICE CREAM MACHINES
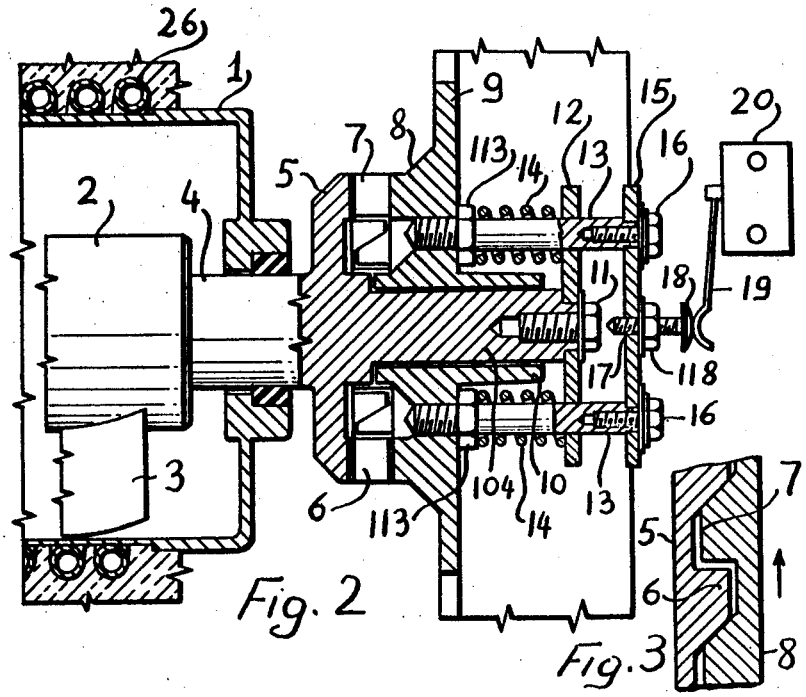
Fig. 2
Fig. 3
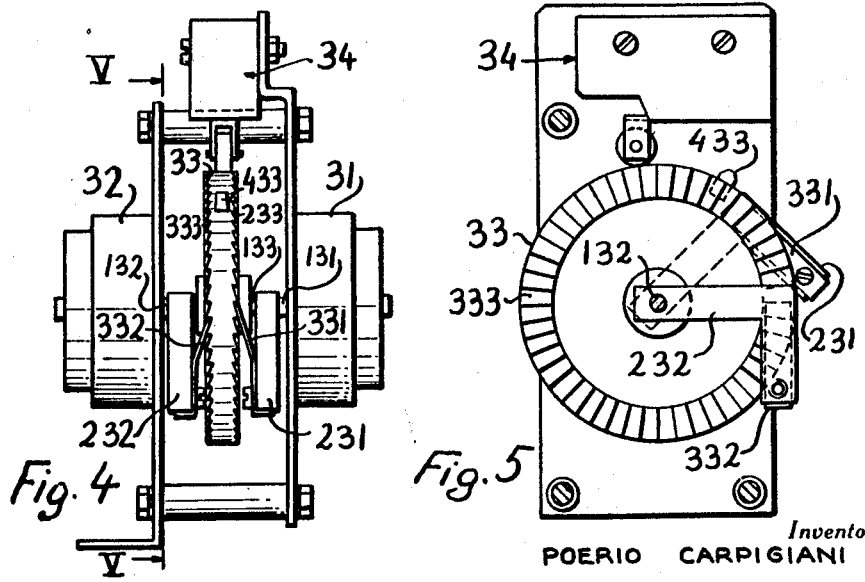
Fig. 4
Fig. 5
*Inventor*
POERIO CARPIGIANI
By *[signature]*
*Attorneys*

United States Patent Office

3,188,826
Patented June 15, 1965

3,188,826
APPARATUS FOR AUTOMATICALLY CONTROLLING THE HARDNESS OF ICE CREAM IN CONTINUOUS ICE CREAM MACHINES
Poerio Carpigiani, Bologna, Italy, assignor to A.P.A.W., S.A., Fribourg-Switzerland, a corporation of Switzerland
Filed Oct. 23, 1962, Ser. No. 232,359
Claims priority, application Italy, Oct. 27, 1961, 19,519/61; June 27, 1962, 13,120/62; Sept. 8, 1962, 18,315/62
4 Claims. (Cl. 62—136)

This invention relates to so-called continuous ice cream machines and aims to provide a method and apparatus, which, without the use of thermostats, is capable of automatically controlling the hardness or consistency of ice cream mixes in said continuous ice cream machines which usually comprise a freezing cylinder, a mixer rotatably mounted in said cylinder; a freezing coil or jacket acting as evaporator for a refrigerating fluid of a conventional refrigerating unit having a power operated compressor and the usual ice cream dispensing or delivery means and means for automatically feeding the ice cream liquid mix, whenever necessary.

It is known that the hardness of ice cream produced in such continuous icre cream machines is a function—inter alia—of the intensity of cooling of the said cylinder of the ice cream machine.

In ice cream machines in which the freezing system is controlled electrically, it is known to start and stop the feed of the electric current by means of thermostats, which act when the temperature in a determined point of the cylinder rises above or falls below two predetermined temperatures (maximum and minimum). This method however, when applied to ice cream machines does not usually give good results, due to the facts that the thermostat is sensitive to the temperature in one point of the freezing cylinder and that the optimum temperature is not the same for all sorts of ice cream, as, notoriously, the freezing temperature must be much deeper for fat ice creams (i.e. ice creams containing a large amount of milk cream or the like) than for ice creams consisting mainly of fruit juices or other preeminently watery mixes.

The object of the present invention is to provide an automatic method for stopping the feed of the refrigerant fluid to a continuous ice cream machine of the kind above-referred to whenever the hardness of the frozen mix in the freezing and mixing ice cream cylinder tends to exceed a predetermined limit and to re-start the feed of said refrigerant fluid whenever the hardness of the ice cream in the said cylinder tends to fall below another predetermined limit.

According to one characteristic feature of the invention, means are fitted on the driving shaft of the mixer of the ice cream machine which, when the resistance to rotation of the mixer exceeds a predetermined limit, stop the feed of the refrigerating fluid to the freezer evaporator which surrounds (in form of a coil or of a jacket) the ice cream machine cylinder, and starts again said feed as soon as the resistance to rotation of the mixer falls below another predetermined limit.

This stopping and starting, or temporary interruption of the feed of the freezing fluid may be effected, according to the invention, by stopping the compressor motor.

In this latter case, according to the invention, a time switch, or the like, is provided for starting again said compressor motor after a predetermined time and additional means are provided for shortening said predetermined time whenever ice cream is dispensed from the machine.

Further characteristic features and advantages of the invention will appear from the following specification taken in connection with the accompanying drawings, in which:

FIGURE 1 diagrammatically shows the method as applied to an electric continuous ice-cream freezer, in which the control of the refrigerating fluid is effected by operating upon the electric motor which drives the freezer compressor;

FIGURE 2 is an enlarged section of the back or feed side of the ice cream cylinder and shows a clutch coupling provided with inclined teeth and having an axially slidable part adapted to slide away from the fixed part, against the action of spring means, whenever the resistance encountered by the helical mixer is in excess of a predetermined one; and means for limiting said sliding;

FIGURE 3 shows a preferred form of clutch teeth;

FIGURE 4 is a side elevation of a time switch coupled with a device for shortening the normal predetermined switch time, each time ice cream is delivered from the machine;

FIGURE 5 is a vertical section of the same device, taken on line V—V of FIGURE 4.

Figure 1:
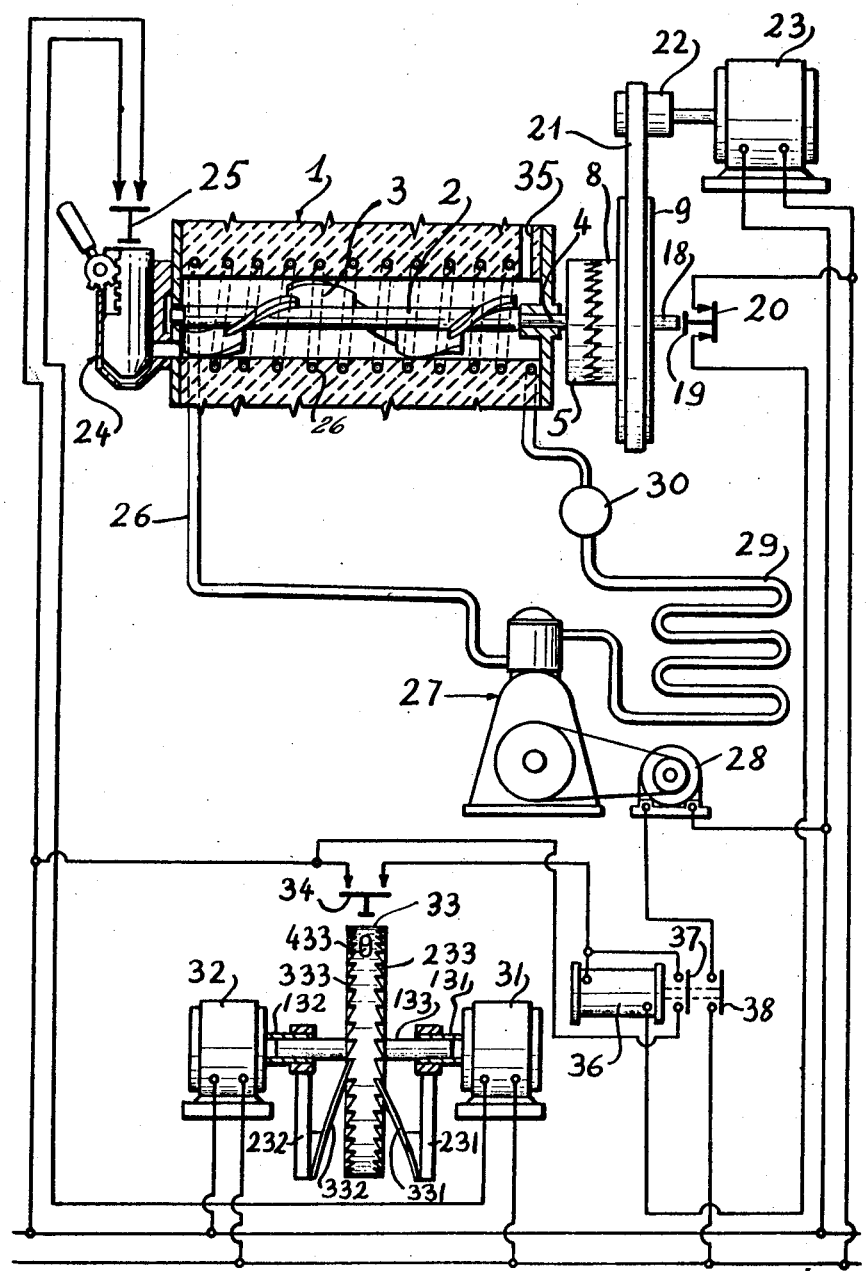

With reference to FIGURES 1 and 2 of the drawings, 1 is the mixing cylinder of an automatic ice cream machine, of the kind as disclosed for example in the U.S. Patent No. 3,018,641 of the same patentee. Inside said cylinder 1 the helical mixer is rotatably mounted and which comprises a shaft 4 on which a hub 2 is fastened which is provided with helical mixing blades 3.

According to the invention, to the rear end of the shaft 4 a clutch coupling disc 5 is mounted having on its front end a crown of inclined clutch teeth 6, see FIGURES 2 and 3, which are coupled to a crown of like teeth 7 formed on the companion disc 8 integral with pulley 9 slidably mounted upon the reduced end 104 of the shaft 4. The pulley 9 is driven through belt 21 by the pulley 22 of an electric motor 23. The rotation of the pulley 9 is effected in the direction of the inclined teeth side, so that when a sufficiently high torque is applied upon the pulley 9, the teeth 7 may slide with their inclined faces upon the correspondingly inclined sides of the teeth 6 and cause the slidable clutch member 8 to be pushed away from the clutch member 5 against the action of springs 14, FIGURE 2, the slipping of the coupling being avoided by abutment of the pulley hub against a fixed member 12.

Said springs 14 are threaded each upon the stem of one of a number of bolts 13 having their threaded ends screwed into one of a crown of tapped holes formed in a flange integral of the pulley hub 10. The springs are compressed between the nuts 113, which serve as abutment members for adjusting the amount of screwing of the threaded bolt ends into their corresponding tapped holes and a plate 12 fastened as by screw 11 to the end of the shaft section 104. Thus the compressed springs 14 by reacting against plate 12 tend to push the pulley 9 and attached coupling member 8 towards the coupling members 5 with a force which may be regulated by screwing more or less of the screw 11 into the corresponding tapped hole at the end of shaft section 104. To the outer ends of bolts 13 a plate 15 is fastened, as by screws 16. In a tapped hole 17 of said plate 15 a preferably bolt-like abutment member 18 is mounted, which is provided with an abutment nut 118 which serves for adjusting the amount of projection of the outer end of said abutment member 18 from the plane of plate 15, and being so arranged that, when the clutch teeth 6 and 7, due to the excessive torque, promoted by the excessive hardness of the ice cream within the cylinder 1 have slid upon each other by a certain amount, which is less than the teeth height, the abutment member 18 abuts against a control member 19 of a micro switch 20 inserted in the circuit of a relay 36 controlling the electric motor 28 of the refrigerating fluid compressor 27. Said compressor 27 draws the refrigerating fluid vapors from outlet end of the evaporator 26 (which for the purpose of illustration is shown as a coil separated from the freezing cylinder 1, but in practice is a coil or jacket surrounding the said cylinder) and compresses same into the condenser 29 where they are liquefied and fed through a conventional throttling valve 30 to the inlet end of said evaporator 26.

In order to surely re-start the thus described devices after a certain time and, which is more important, in order to shorten the starting time whenever ice cream is dispensed or delivered from the machine, the following arrangement has been provided:

Referring particularly to FIGURES 1, 4 and 5, the arrangement comprises also a long-delay time switch and a short delay time switch, coupled together and with the delivery or dispensing devices of the machine, as will be seen hereinafter.

In the embodiment as shown, the said two time switches comprise a pair of electric motors 31 and 32, provided, if necessary, with step-down gears (not shown). The control shafts 131, 132 of said motors (or of the step-down gears, as the case may be) are co-axial and hollow and in their interior are idly supported the ends of a shaft 133 on which a cam disc 33 is mounted, which is provided at its periphery with a control cam 433 adapted to operate a switch 34.

Said cam disc 33 is provided at its rim sides with a double row of ratchet teeth 233 and 333 sloping in the same direction and adapted to co-act each with driving spring blade or pawl 332, 331 carried by a crank arm 232, 231 mounted upon said hollow shafts 132, 131. The shaft 132 is revolved continuously at a slow speed (it accomplishes, for example, one revolution every 10 minutes) and the unit comprising this shaft, arm 232, pawl 332 and ratchet cam disc 33 with corresponding switch 34 consitutes a long-delay time switch. The co-axial shaft 131, on the contrary, is normally stopped and is driven at a much higher speed than shaft 132, and for example it accomplishes 1 rev./minute each time the circuit of the motor 31 is closed, which happens each time and as long as the switch 25 (FIGURE 1) is closed by opening the dispensing means, such as cock 24, which, in the example as shown, is constructed as particularly disclosed in the U.S. Patent No. 3,052,381 of the same applicant.

By the closure of the contact 34 a relay 36 is energized, which closes at the same time two switches, 37 and 38; The switch 37 shunts the cam switch 34 so that engergizing circuit of relay 36 remains closed even after the re-opening of said cam switch 34, while the switch 38 closes the circuit of the motor 28 which drives the compressor 27.

The operation of the thus described arrangement may be summarized as follows:

Assuming the ice cream machine is in operation, with the cylinder 1 filled with ice cream mix and the helical mixer revolving therein, while the freezer unit compressor 27 is also in operation. As soon as the ice cream mix is frozen to such a degree that its hardness is in excess of the predetermined one (which may be regulated by regulating the force of the clutch springs 14 by screwing in and out the screw 11) the clutch teeth 7, FIGURE 3, slide upon the teeth 6 until the adjustable abutment member or pusher 18 carried by the plate 15 is shifted axially, to act upon the switch lever 19 opening the switch 20 thus de-energizing the relay 36 and opening the switch 38 on the circuit of the compressor motor 28. Thus, when the clutch member 28 is against pushed by its springs 14 towards the other clutch member 5, which permits the closure of the switch 20, the compressor motor 28 remains stopped due to the opening of switch 38.

This switch 38, together with the other switch 37 are closed however, after a period of time by the time switch 34 controlled either by the slow motor shaft 132 (when no ice cream has been dispensed) or by the faster motor shaft 131 each time and as long as the dispensing cock 24 is opened so that by the closing of said switches 37 and 38 the compressor 27 is put into operation. Also, each time ice cream is dispensed, the helical mixer pushes the ice cream towards the dispensing end of the ice cream machine while into the opposite cylinder end fresh liquid mix from a reservoir (not shown) flows through the feed port 35 into the cylinder 1. The ice cream machine may thus work continuously.

The described device may be adopted only in electric ice cream machines.

From the foregoing, it is apparent that a very efficient method and apparatus have been devised for automatically stopping, in continuous ice cream machines, the circulation of the refrigerating fluid through the evaporator of a refrigerating unit, whenever the hardness of the ice cream exceeds a predetermined limit and this without the use of thermostats.

It is to be understood however that the invention shall not be limited to the hereinbefore described embodiments of ice cream machines equipped with devices or arrangements realising the above method, but shall include all constructions which may be deemed based on the basic idea of the invention, as fully set out above and as claimed hereinafter:

I claim:

1. In a continuous ice cream machine of the type having an ice cream freezing cylinder, a refrigerating unit including an evaporator surrounding said cylinder, a condenser and a compressor for compressing and circulating a refrigerant through said evaporator and condenser, a rotatable mixer in said cylinder provided with a shaft projecting outwardly from one end of said cylinder, power means and transmissions for driving said compressor and said mixer shaft, a duct for feeding a liquid mix to be frozen into said one end of the cylinder and a delivery cock at the opposite cylinder end, the improvements comprising a clutch in one of said transmissions which drives said shaft, said clutch having a first part fixed to said mixer shaft, a second part axially shiftable with respect to the mixer shaft and connected to the said mixer shaft driving transmission, spring means between said mixer shaft and said second clutch part for pushing the second part into engagement with said first clutch part, and means operated by said shiftable second clutch part when it is shifted axially away from said first coupling part to interrupt the flow of said refrigerant through said evaporator, said power means comprising an electric motor connected to a source of electric power for continuously driving the said mixer shaft and a second electric motor connected to said source of power for driving the said compressor, said means to interrupt the flow of refrigerant including an electromagnetic relay coil connected across said source of electric power, a magnetic plunger movable within said coil, first and second pairs of normally open contacts operable to close by said movable plunger, one of the said pairs of contacts being inserted between the said source of electric power and the compressor motor, while the said second pair of contacts is inserted between one terminal of the coil of said relay and one terminal of the source of electric power, a normally closed third pair of contacts inserted between the second terminal of the said source of electric power and the other terminal of said relay coil, said third pair of contacts being operable to open by shifting movement of said second clutch part, a normally open fourth pair of contacts connected in parallel with the said second pair of contacts, and a timer mechanism for periodically closing said fourth pair of contacts.

2. A continuous ice cream machine comprising an ice cream freezing cylinder, a refrigerating unit including an evaporator surrounding said cylinder, a condenser and a compressor for compressing and circulating a refrigerant through said evaporator and condenser, a rotatable mixer in said cylinder, power means and transmissions for driving said compressor and said mixer, a duct for feeding a liquid mix to be frozen into one end of the cylinder, a delivery cock at the opposite end of the cylinder and torque responsive means for interrupting the flow of said refrigerating fluid through said evaporator when the viscosity of ice cream in said cylinder reaches a predetermined limit, said power means comprising an electric motor connected to a source of power for continuously driving the said mixer and a second electric motor connected to said source of electric power for driving the said compressor, said torque responsive means to interrupt the flow of refrigerant including an electromagnetic relay coil, a magnetic plunger movable within said coil, first and second pairs of normally open contacts operable to close by said movable plunger, one of the said pairs of contacts being inserted between the said source of electric power and the compressor motor, while the said second pair of contacts is inserted between one terminal of the coil of said relay and one terminal of the source of electric power, a normally closed third pair of contacts between the second terminal of the said source of electric power and the other terminal of said relay coil, said pair of third contacts being operable to open by increased resistance of the ice cream mix to rotation of said mixer, a normally open fourth pair of contacts connected in parallel with the said second pair of contacts, and a timer mechanism for periodically closing said fourth pair of contacts.

3. A machine according to claim 2 in which said timer mechanism includes a slow timer motor and a fast timer motor having output shafts coaxial with a common disc positioned between them, free wheel coupling means connecting each of said output shafts to said common disc, said slow motor being continuously energized, said disc having a cam for periodically engaging and closing said fourth pair of contacts, and said fast motor being connected to said source of electric power by means operably connected to said delivery cock so as to energize the fast motor each time ice cream is dispensed.

4. A machine according to claim 3 wherein said free wheel coupling means comprises a peripheral row of ratchet teeth on each side of said disc, and a pair of pawls connected to said output shafts and engaging said ratchet teeth.

References Cited by the Examiner
UNITED STATES PATENTS

| | | | |
|---|---|---|---|
| 1,930,941 | 10/38 | Modlin | 62—136 |
| 2,536,319 | 1/51 | Slack | 62—136 |
| 2,873,584 | 2/59 | Claudy | 62—135 |
| 3,013,398 | 12/61 | Thomas | 62—136 |
| 3,052,103 | 9/62 | Clark | 62—343 |
| 3,053,057 | 9/62 | McGrath | 62—158 |
| 3,075,480 | 1/63 | Berg | 62—136 XR |
| 3,108,449 | 10/63 | Lentz | 62—136 XR |

FOREIGN PATENTS 1,007,418   2/52   France.

ROBERT A. O'LEARY, *Primary Examiner.*
MEYER PERLIN, *Examiner.*